US008819749B2

(12) United States Patent
De Nijs et al.

(10) Patent No.: US 8,819,749 B2
(45) Date of Patent: Aug. 26, 2014

(54) SYNCHRONIZATION OF MEDIA STREAM COMPONENTS

(75) Inventors: Gilein De Nijs, Amsterdam (NL); Jozef Pieter Van Gassel, Tampere (FI)

(73) Assignee: Koninklijke Philips B.V., Eindhoven (NL)

(*) Notice: Subject to any disclaimer, the term of this patent is extended or adjusted under 35 U.S.C. 154(b) by 520 days.

(21) Appl. No.: 12/995,683

(22) PCT Filed: Jun. 4, 2009

(86) PCT No.: PCT/IB2009/052357
§ 371 (c)(1),
(2), (4) Date: Dec. 2, 2010

(87) PCT Pub. No.: WO2009/150578
PCT Pub. Date: Dec. 17, 2009

(65) Prior Publication Data
US 2011/0083155 A1   Apr. 7, 2011

(30) Foreign Application Priority Data

Jun. 11, 2008   (EP) .................................... 08158009

(51) Int. Cl.
*H04N 7/18*   (2006.01)
*H04N 21/43*   (2011.01)

(52) U.S. Cl.
CPC ................................. *H04N 21/4307* (2013.01)
USPC ......................................................... 725/94

(58) Field of Classification Search
None
See application file for complete search history.

(56) References Cited

U.S. PATENT DOCUMENTS 5,909,431 A   6/1999   Kuthyar et al.
6,363,207 B1   3/2002   Duruoz et al.
6,598,172 B1*   7/2003   VanDeusen et al. .......... 713/503
7,710,943 B2*   5/2010   Seo et al. ....................... 370/350
8,010,986 B2*   8/2011   Dakss et al. ..................... 725/93
2004/0190629 A1   9/2004   Cooper et al.
2006/0109929 A1   5/2006   Tripathi
2006/0203853 A1*   9/2006   Hwang ......................... 370/503
2006/0251394 A1   11/2006   Ando et al.
2009/0164655 A1*   6/2009   Pettersson et al. ............ 709/231
2009/0249222 A1*   10/2009   Schmidt et al. ............... 715/751
2009/0295992 A1*   12/2009   Richardson et al. .......... 348/515
2011/0064082 A1*   3/2011   Zalewski ...................... 370/392

FOREIGN PATENT DOCUMENTS

| EP | 1775964 A1 | 4/2007 |
| JP | 2006014299 A | 1/2006 |
| WO | 2006031925 A2 | 3/2006 |
| WO | 2006106185 A1 | 10/2006 |
| WO | 2006126852 A1 | 11/2006 |
| WO | 2007099978 A1 | 9/2007 |

* cited by examiner

*Primary Examiner* — Nathan Flynn
*Assistant Examiner* — Omar S Parra

(57) ABSTRACT

A method for synchronizing a plurality of components of a broadcast media stream, includes buffering streams of data samples for a plurality of components of a broadcast media stream and buffering a plurality of information packets. The stream of data samples for each of the plurality of components includes relative timing information, each information packet including timing information indicating a relationship between the relative timing information in the components and an absolute time. The method further includes performing a look-ahead action on the buffered information packets to extract timing information for each of the plurality of components; and using the extracted timing information and relative timing information to synchronize the plurality of components.

13 Claims, 5 Drawing Sheets

SYNCHRONIZATION OF MEDIA STREAM COMPONENTS

TECHNICAL FIELD OF THE INVENTION

The invention relates to the synchronization of components of a media stream, such as audio and video, and in particular to the synchronization of components in a Digital Video Broadcasting-Handheld (DVB-H) system.

BACKGROUND TO THE INVENTION

Digital Video Broadcasting-Handheld (DVB-H) is a standard for providing television broadcasts and other video and audio streams to mobile or handheld devices.

In DVB-H, time slicing is used, which means that different services (i.e. different TV channels) are transmitted in respective "slices" of time or bursts. FIG. 1 shows an exemplary DVB-H transmission structure. In this example, the DVB-H Transport Stream 2 is transmitted at 2 Mbps and contains four different services, each with an average bit rate of 500 kbps. As a result of the time slicing, each service is transmitted at the maximum bit rate of 2 Mbps for a quarter of the time. Therefore, a receiving device using a single service can deactivate the DVB-H receiver for 75% of the time. Thus, time slicing is used in DVB-H to reduce the power consumption in receiving devices.

As shown in FIG. 1, in DVB-H streams, the audio and video information is sent via separate streams (and in particular User Datagram Protocol (UDP) sockets), labeled 225.0.0.1:4000 and 225.0.0.1:5000 respectively, using the Real-time Transport Protocol (RTP). This protocol is designed so that different media components of a multimedia session (for example video and audio) can be transported via different channels/routes (possibly coming from different sources: for example a microphone and a camera in video conferencing). When using RTP, it is possible for the broadcast audio and video streams to be out of synchronization by as much as a few seconds.

Consequently, the audio and video streams must be synchronized in time in the receiving device in order to avoid lip-sync problems. Even small deviations between the video and audio streams can be perceived by a user.

There are two separate synchronization issues for a DVB-H broadcast. The first synchronization issue occurs when the user selects or changes the received service (i.e. the user activates the receiving device, or switches from "Service 1" in FIG. 1 to "Service 2"). In this case, the receiving device must change to the new service and synchronize the new video and audio streams. This synchronization can take several seconds, which means that there will be a delay for the user before the new service is presented. In addition to the video and audio streams, there may be further components that need to be synchronized (for example graphics or subtitles).

The second issue is that the synchronization between the video and audio streams can drift over time, and may need to be corrected.

In RTP, these synchronization issues are mitigated by using RTP Control Protocol (RTCP) Sender Report packets that are sent along with the audio and video streams. As shown in FIG. 1, each of the video and audio streams are paired with a respective stream containing RTCP Sender Report packets, with stream 225.0.0.1:4001 carrying the RTCP Sender Report packets 4 for video stream 225.0.0.1:4000, and stream 225.0.0.1:5001 carrying the RTCP Sender Report packets 6 for audio stream 225.0.0.1:5000.

However, it can be seen from this figure that when a video and audio stream are first received, it is necessary to wait until RTCP Sender Report packets have been received for each of the audio and video streams before the streams can be synchronized (labeled the "sync point" in FIG. 1).

An exemplary structure of an RTCP Sender Report packet in accordance with the RTCP specification is shown in FIG. 2. The packet comprises a header section that specifies the version of the protocol being used (V), a padding indicator bit (P), the number of reception report blocks in the packet (RC), the packet type (PT—i.e. a sender report SR), the length of the packet in 32-bit words and the synchronization source identifier for the source of the sender report packet (SSRC). The packet also comprises a Sender Information section that specifies a 64-bit Network Time Protocol (NTP) time stamp (which is referred to herein as an absolute time), an RTP time stamp that reflects the sampling time of the first octet in the RTP data packet in the video or audio stream, a sender's packet count that shows the total number of RTP data packets transmitted by the sender up until the transmission of the sender report and a sender's octet count that shows the total number of payload octets transmitted by the sender up until the transmission of the sender report.

Every RTP data packet carries RTP time stamps that show the time elapsed since the sampling instant of the first octet in the RTP data packet. The RTP time stamps are usually specific to a particular media stream (i.e. video or audio), and use respective starting points and frequencies for counting increments in the time stamp. Thus, as different audio and video streams do not use the same time base (i.e. the clock frequency and start offsets) for the RTP time stamps, they are not directly comparable.

Therefore, every audio and video RTP stream is paired with a respective stream containing RTCP packets as described above. As shown in FIG. 2, these RTCP Sender Report packets include an NTP time stamp and an RTP time stamp that represent the same time, but in different time bases. As the NTP time stamp is identical for all of the different media components (e.g. audio and video), then it is straightforward to synchronize all of the streams. In particular, a presentation time stamp (PTS) is calculated for each component using the timing information, with the PTS indicating the time at which the relevant data sample should be retrieved from a buffer, decoded and presented to a user.

In DVB-H applications, it is recommended that RTCP packets are sent every five seconds. However, when a change in service has been made, this means that it will take up to five seconds before the next RTCP packet is received and the RTP time stamps of the audio and video streams can be related to each other using the timing information. This means that audio and video streams may be out of sync for up to the first five seconds after selecting or changing a service.

In addition, during a broadcast, when a new RTCP sender report packet is received and it is determined that it is necessary to correct the synchronization, the adjustment or correction can be perceived by the user as a slight jump or artefact in the presented audio or video.

SUMMARY OF THE INVENTION

Therefore, there is a need for a method and a device for use with broadcasts in accordance with the DVB-H specification that overcome the disadvantages set out above. In particular, there is a need for a method and device that has an improved synchronization time when a new service is selected, and that provides a smoother transition when a correction of the synchronization between the components of the media stream is implemented. The invention is defined by the independent claims. The dependent claims define advantageous embodiments.

In accordance with a first aspect of the invention, there is provided a method for synchronizing a plurality of components of a broadcast media stream, the method comprising buffering streams of data samples for a plurality of components of a broadcast media stream and buffering a plurality of information packets, the stream of data samples for each of the plurality of components including relative timing information, each information packet comprising timing information indicating a relationship between the relative timing information in the components and an absolute time; performing a look-ahead action on the buffered information packets to extract timing information for each of the plurality of components; and using the extracted timing information and relative timing information to synchronize the plurality of components.

In one embodiment, each information packet is associated with a respective one of the plurality of components, and the timing information indicates a relationship between the relative timing information in their respective components and absolute time.

Preferably, the method further comprises the step of streaming the synchronized data samples in the plurality of components.

In one embodiment, the method further comprises the steps of storing the information packets in a memory; and using the timing information in the information packets stored in the memory to synchronize the data samples in the plurality of components until further information packets are received.

In this embodiment, the broadcast media stream comprises a plurality of selectable services, and the method further comprises the step of receiving information packets for components in each of the selectable services; and storing the information packets in the memory.

Preferably, the stream of data samples for the plurality of components comprises a first selectable service in the broadcast media stream, and the stored information packets for a second selectable service are used in the event that the second service is selected, and before respective information packets for the second service are received.

Preferably, the data samples are received in bursts, and an information packet is received with each burst.

Preferably the step of using the extracted timing information and relative timing information comprises determining the data samples in the plurality of components that are to be streamed at the same time.

Preferably, the method further comprises the steps of comparing the determined data samples that are to be streamed at the same time to a previously determined set of data samples that are to be streamed at the same time to identify a drift between the plurality of components; and adding or omitting data samples from the particular component to correct for the identified drift as the data samples are streamed from the buffer.

In this embodiment, the drift is corrected by adding or omitting data samples before the one or more data samples received with the information packet used to determine the drift are streamed.

Preferably, data samples are added by duplicating existing data samples.

Preferably, the method further comprises the step of storing the results of the step of comparing in a memory.

Preferably, the method further comprises calculating an average correction from the results stored in the memory; and using the calculated average correction to predict a required correction to a particular component.

In preferred embodiments, the broadcast media stream is broadcast in accordance with the Digital Video Broadcasting-Handheld specification.

In these embodiments, the relative timing information comprises Real-time Transfer Protocol (RTP) time stamps, the information packets are RTP Control Protocol (RTCP) Sender Report packets, and the absolute time is determined in accordance with the Network Time Protocol (NTP).

Preferably, a component of the broadcast media stream comprises one selected from video, audio, graphics, subtitles and interactive content.

In accordance with a second aspect of the invention, there is provided a device for presenting a broadcast media stream to a user, the device comprising a buffer for storing a stream of data samples for a plurality of components of the broadcast media stream and a plurality of information packets, each component comprising relative timing information for the data samples within the stream, each information packet comprising timing information indicating a relationship between the relative timing information in the components and an absolute time; and a processor that is adapted to: perform a look-ahead action to extract the timing information from the buffered information packets for each of the components; and use the extracted timing information and relative timing information to synchronize the plurality of components.

Preferably, the device further comprises a memory for storing the extracted timing information.

A third aspect of the invention provides a computer program product comprising computer readable code that, when executed by a processor, is adapted to perform the method as described above.

These and other aspects of the invention will be apparent from and elucidated with reference to the embodiments described hereinafter.

BRIEF DESCRIPTION OF THE DRAWINGS

The invention will now be described, by way of example only, with reference to the drawings, in which.

DETAILED DESCRIPTION OF EMBODIMENTS

The invention will now be described with reference to a broadcast media stream that comprises audio and video components, although it will be appreciated that the invention is applicable to media streams comprising different or additional components, including, but not limited to, subtitles, graphics and interactive content.

Furthermore, although the invention will be described with reference to a DVB-H system, it will be appreciated that the invention is applicable to other systems (including systems for use with non-mobile or non-portable devices) that use time slicing to deliver the services over an air or wired interface.

Figure 1:
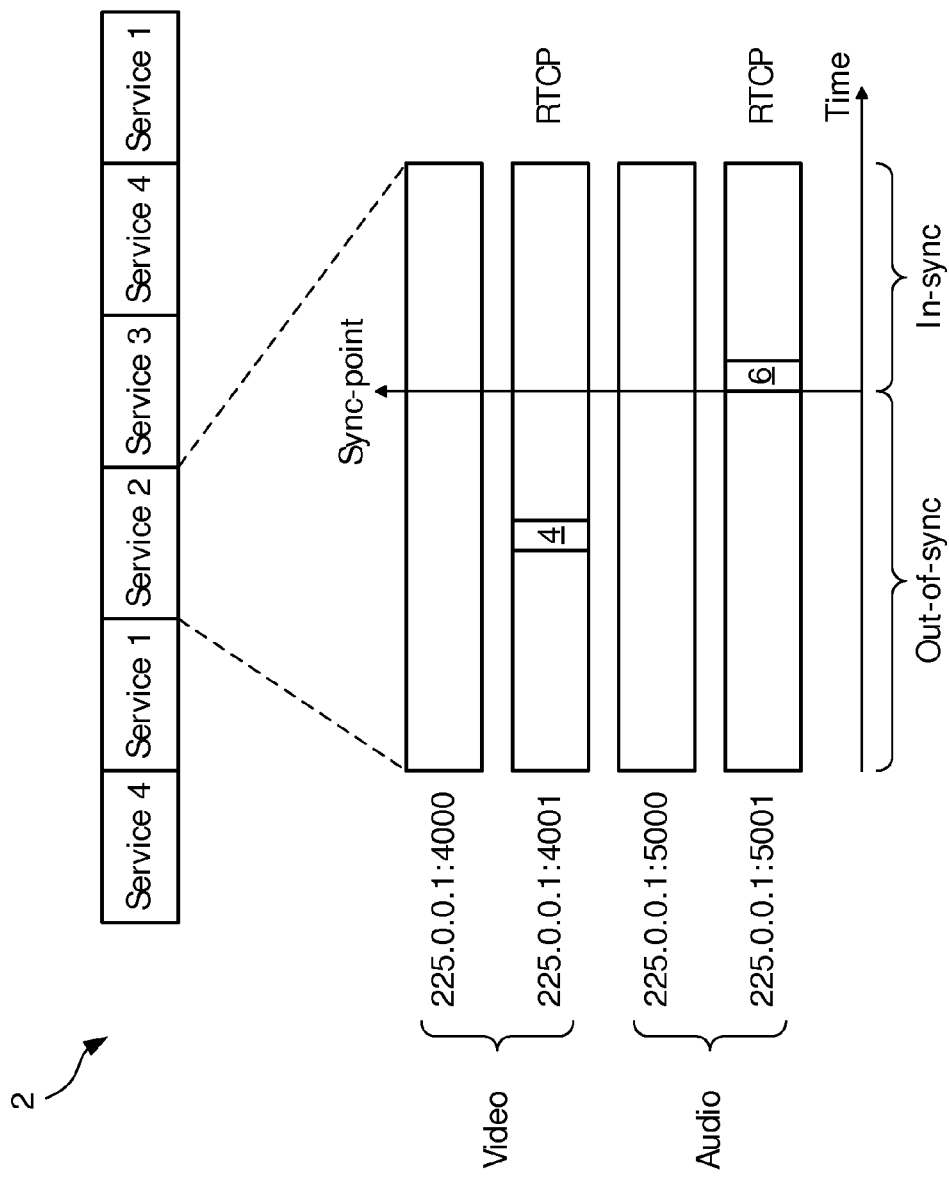
FIG. 1 shows the structure of a broadcast in a DVB-H system.
Figure 2:
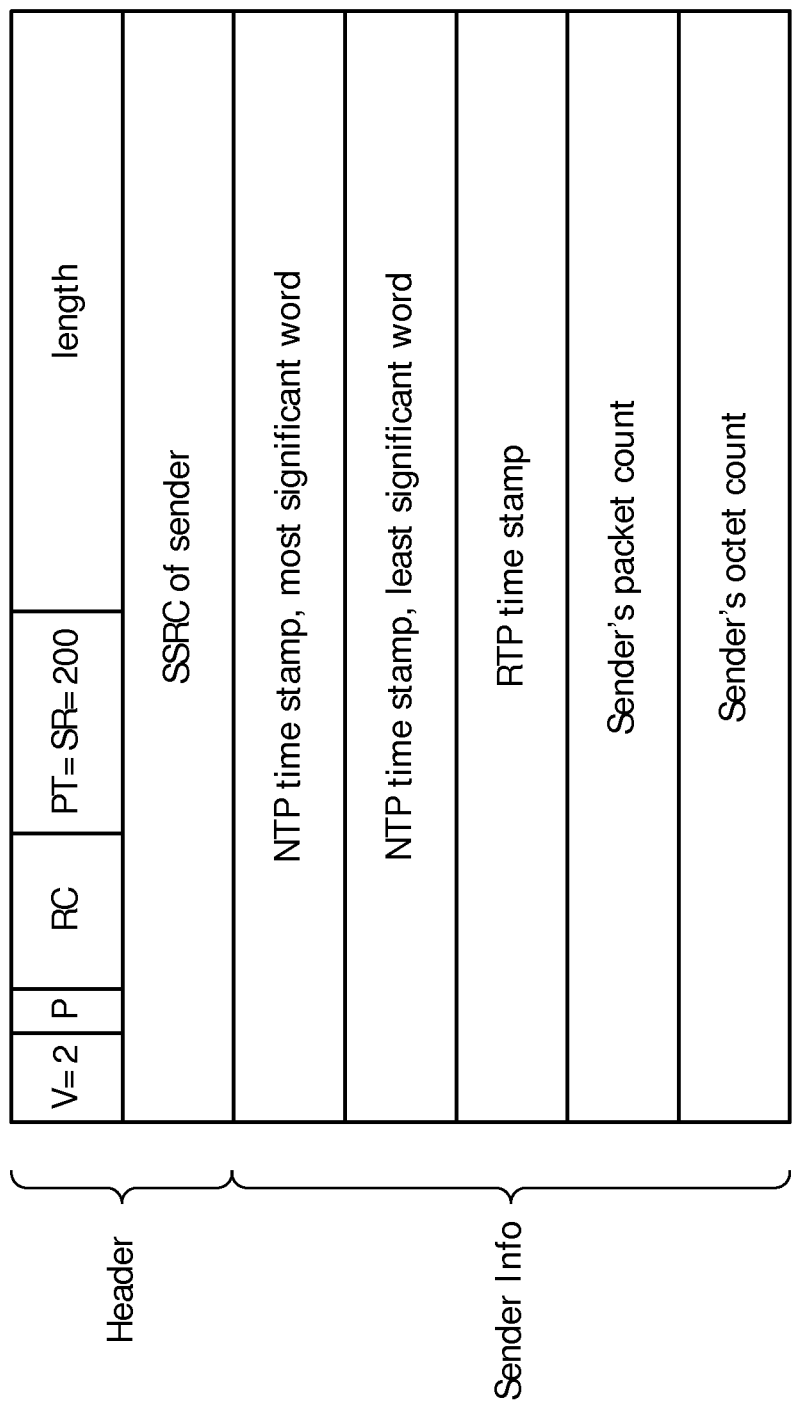
FIG. 2 shows the structure of an exemplary RTCP Sender Report packet.
Figure 3:
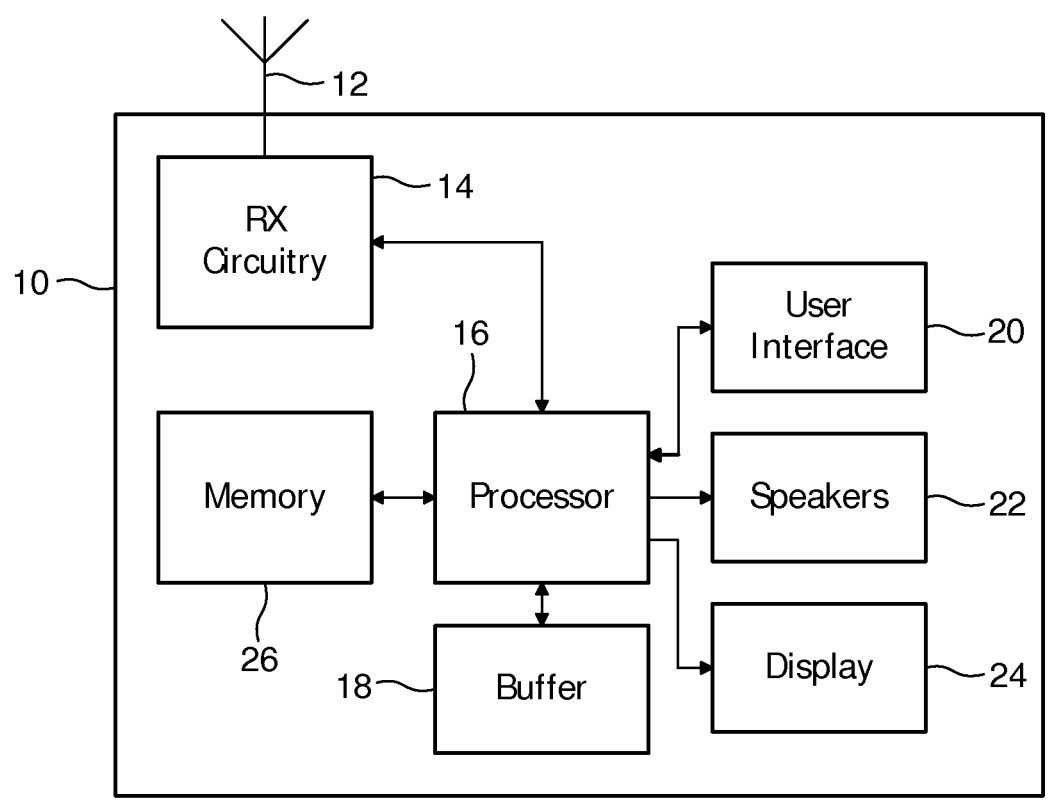
FIG. 3 is a block diagram of a mobile device in accordance with an embodiment of the invention.

Referring now to FIG. 3, a mobile device in accordance with an embodiment of the invention is presented. The mobile device 10, which may be any device that can receive a broadcast media stream, for example a mobile telephone, a personal digital assistant or a portable television device, comprises an antenna 12 and receiver circuitry 14 for receiving the broadcast media stream over an air interface. The receiver circuitry 14 is connected to a processor 16 that controls the operation of the mobile device 10. The mobile device 10 further comprises a buffer 18 that is connected to the processor 16, and which is used to store the packets of data samples for the components of the incoming media stream.

A user interface 20 that receives commands from a user of the mobile device 10 is also connected to the processor 16, along with a speaker or speakers 22 and a display 24. The speakers 22 and display 24 are used to present the media stream to the user when the processor 16 retrieves and decodes the media components from the buffer 18.

In some embodiments, the mobile device 10 can further comprise a memory 26 that is connected to the processor 16.

Thus, an incoming media stream comprising a plurality of components is received by the mobile device 10 using the antenna 12 and receiver circuitry 14, and is stored in the buffer 18 by the processor 16. To initially present the media stream to the user of the mobile device 10 (i.e. when the device 10 is first switched on, when the device 10 first starts to receive a broadcast media stream or when the user selects a new service of the broadcast media device to view), the processor 16 determines an NTP time stamp for each of the audio and video packets, which is used to indicate which audio packet should be streamed from the buffer 18 with a particular video packet, and streams the packets from the buffer 18 to the appropriate output of the mobile device 10 (i.e. speakers 22 or display 24). The actual time of presentation (i.e. the time at which a packet is streamed from the buffer 18) can be determined by the processor 16 from a presentation time stamp (PTS) or just by the processor 16 respecting the frame rate of the video stream (i.e. streaming video data for a specific number of frames per second).

It will be appreciated that when the mobile device is a mobile telephone, receiver circuitry 14 can be replaced with transceiver circuitry, or separate transmitter circuitry can be provided for uplink communications with a communications network.

Furthermore, it will be appreciated that, in some embodiments, the receiver circuitry 14 can provide the received media stream straight to the buffer 18 without passing through the processor 16.

Figure 4:
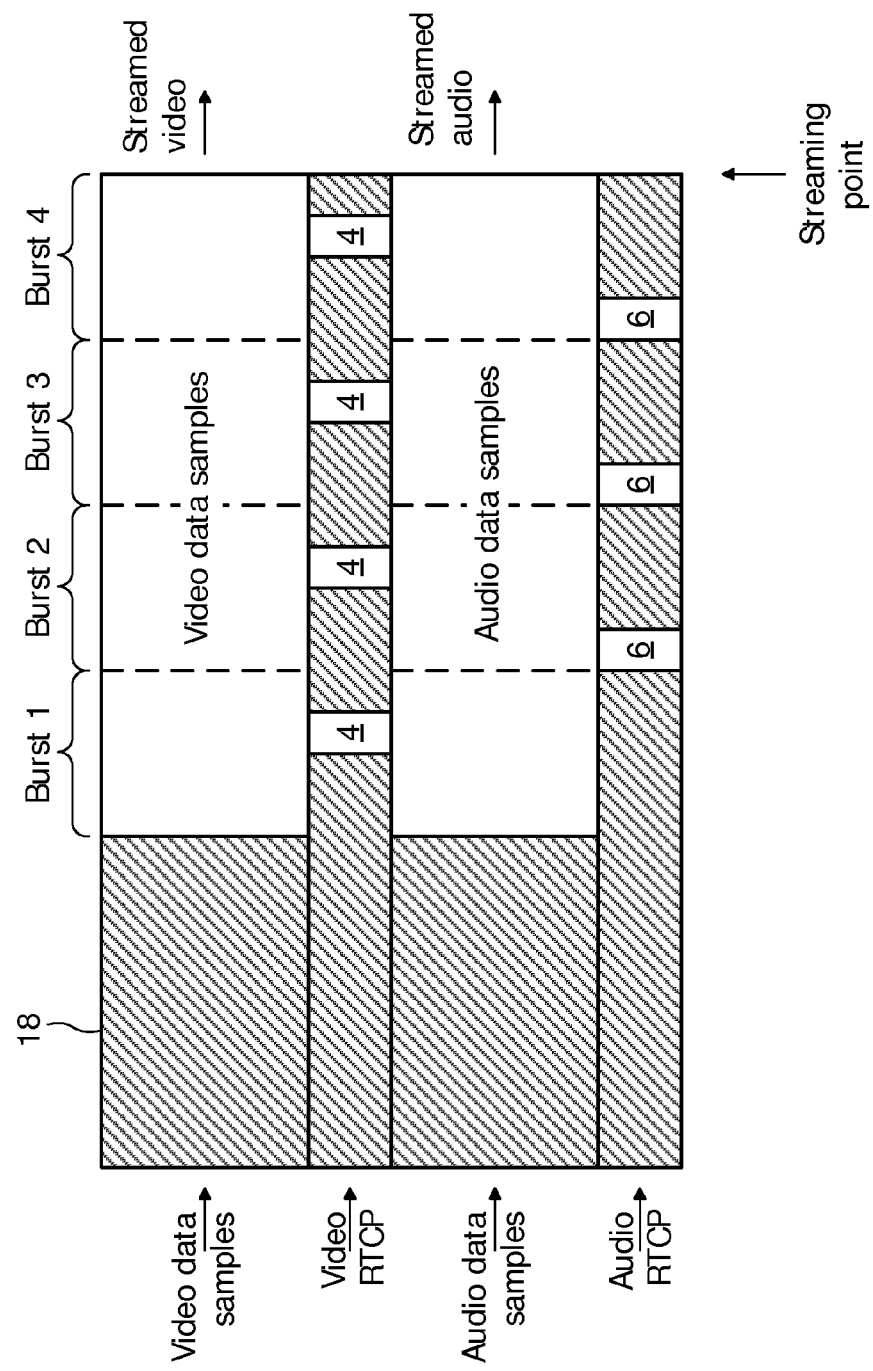
FIG. 4 shows the content of a buffer in a DVB-H system at an arbitrary time instant.

FIG. 4 shows the content of a buffer 18 in a DVB-H system at an arbitrary time instant. In this illustration, data samples being streamed into the buffer 18 come from the left, and data samples being streamed out of the buffer 18 (from the streaming point) to the speakers 22 or display 24 go to the right. As the media stream, in this example, comprises two components, namely video and audio, the buffer 18 is effectively divided into two sections, with the first section (shown in the top half of FIG. 4) storing the video data samples, and the second section (shown in the bottom half of FIG. 4) storing the audio data samples.

The data samples for each of the components received during each time slice or burst are shown in the buffer 18. As described above, when the data samples are generated by the source of the component of the media stream, the samples are time stamped. However, each component uses a different base for the time stamps, so the time stamps of different components are not directly comparable.

Thus, each component is accompanied by a respective channel that is broadcast simultaneously with the data channel and which contains information packets 4, 6 that include timing information indicating a relationship between the relative time stamps in the components and an absolute time. These information packets 4, 6 are stored in the buffer as shown in FIG. 4.

In a DVB-H system, the data samples are broadcast using the Real-time Transfer Protocol (RTP), and so include RTP time stamps. In addition, the information packets are RTCP Sender Reports and the timing information indicates a relationship between the RTP time stamps and an absolute time (i.e. NTP time).

Conventionally, the information packets 4, 6 are read by the processor 16 or other media player when they are streamed out of the buffer 18 with their respective audio and video streams (i.e. they are read when the streaming point reaches the respective information packets).

However, in accordance with the invention, the processor 16 is able to perform a look-ahead action, which means that it looks ahead of the current streaming point in the buffer 18 (i.e. the point from which data samples are currently being streamed from) for any "future" information packets that are already stored in the buffer 18. In other words, the processor 16 examines the information packets that are in the buffer 18, rather than waiting for them to be streamed out the buffer 18 with the data samples. Alternatively, the look-ahead action can result in the processor 16 examining the information packets as they are received by the receiver circuitry 14 (i.e. before they are stored in the buffer 18).

This "look-ahead" action by the processor 16 is possible because of the time slicing structure of the broadcast media stream as data samples are received in a particular time slice much faster than a component decoder in the processor 16 can use them.

Figure 5:
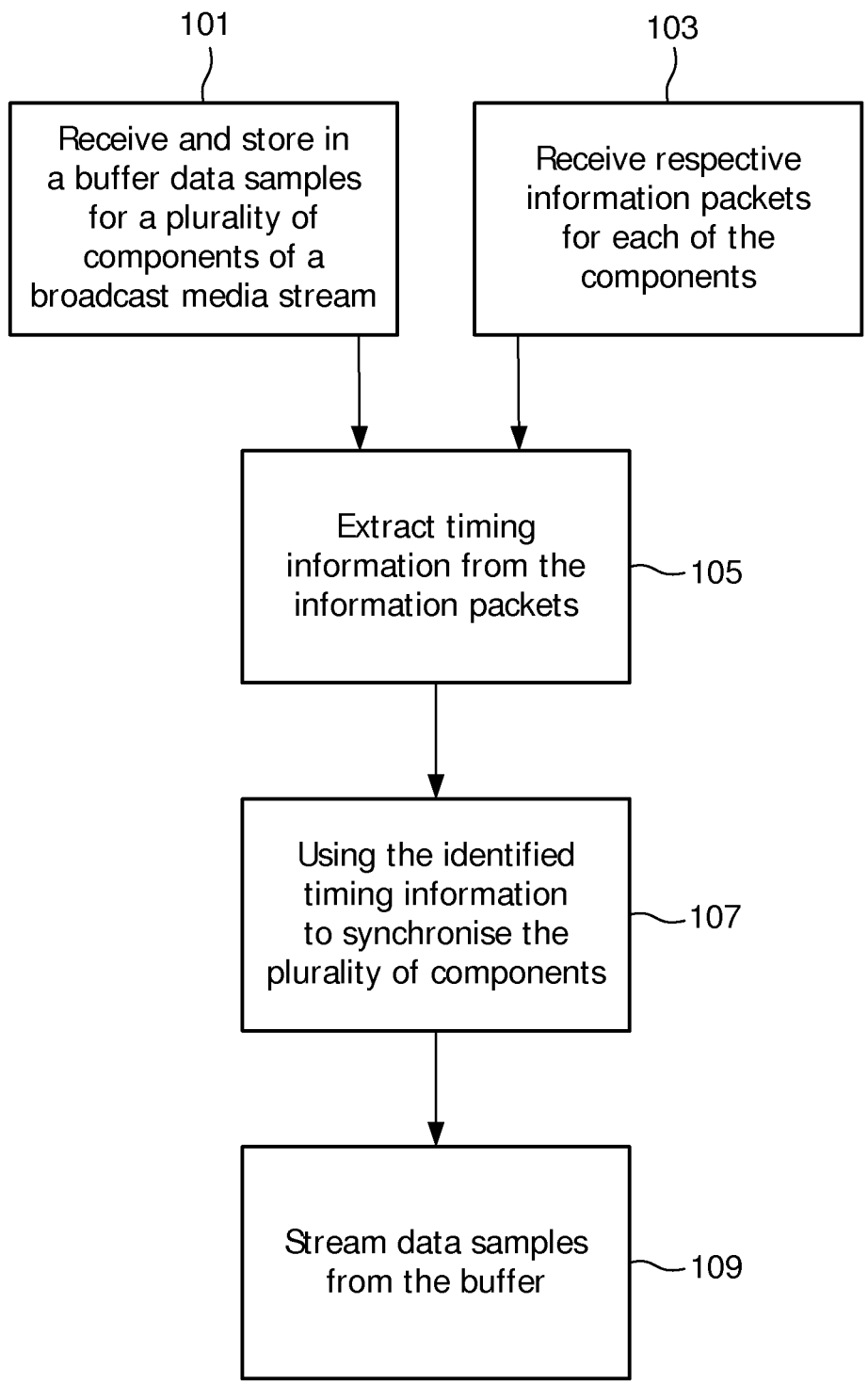
FIG. 5 is a flow chart illustrating a method in accordance with an embodiment of the invention.

FIG. 5 is a flow chart illustrating the operation of the mobile device in accordance with an aspect of the invention.

In step 101, data samples for a plurality of components of a broadcast media stream are received and stored in the buffer 18. Each of the components comprises relative time stamps for the data samples in the stream.

In step 103, respective information packets for each of the components are received and stored in the buffer 18. Each of the information packets includes timing information indicating a relationship between the relative time stamps in their respective components and an absolute time.

In step 105, the processor 16 performs a look-ahead action on the buffer 18 and extracts the timing information from the received information packets. Alternatively, the processor 16 can read the timing information when the information packets are received by the receiver circuitry 14. Consequently, the timing information is extracted from the information packet before the data samples that were received concurrently with that information packet are streamed from the buffer 18. As information packets are received intermittently, the processor 16 can periodically repeat the look-ahead action.

In step 107, the processor 16 uses the identified timing information to relate the relative time stamps of the data samples in the components to absolute time. As the samples from the different data streams now have a common time base, the processor 16 can synchronize the components by determining which samples in one component should be streamed with which samples in another component.

Finally, in step 109, the synchronized data samples in the components are streamed from the buffer 18.

It will be appreciated that, due to the nature of a data streaming system (i.e. data is being periodically received (in the case of a burst transmission) and continuously streamed to a user), each of the steps in this method are being performed somewhat simultaneously by the mobile device 10, although on different parts of the media stream. For example, steps 101 and 103 will occur at substantially the same time for a particular burst (and are hence shown side by side in the flow chart), while the processor 16 is streaming data samples from earlier in the broadcast media stream to a user.

Thus, when the device 10 is first switched on, when the device 10 first starts to receive a broadcast media stream or when the user selects a new service of the broadcast media stream, the method described above allows the plurality of components to be synchronized much quicker than the conventional method. In fact, if an information packet (RTCP Sender Report) is available in the first burst, synchronization can be realized almost as soon as the service change occurs.

In addition, by using the method described above, it is possible to determine whether the plurality of components need to be resynchronized (i.e. if the timing between the components has drifted) earlier than with the conventional method. Furthermore, as described in more detail below, early detection of a synchronization correction being required allows the correction to be implemented over a short period of time (i.e. a number of frames) rather than at particular time instant, as in the conventional method. In this way, user-perceptible artefacts will be reduced.

Further details of these two implementations are provided below.

Synchronization of Components in a New Service

Thus, when the device 10 is first switched on, when the device 10 first starts to receive a broadcast media stream or when the user selects a new service of the broadcast media, the device 10 receives the first selected burst and stores the data samples and RTCP Sender Report packets in the buffer 18.

Although the processor 16 can start to consume (i.e. stream) the received media components from the buffer 18, it can simultaneously perform the look-ahead action to inspect the remainder of the buffer 18 for available RTCP packets of all necessary media components.

If such RTCP packets are found for at least two of the different media components, the individual component RTP time stamps in the data sample streams can be translated back into one absolute time base using the timing information in the RTCP Sender Report packets that links the RTP time stamps to NTP time. In particular, since the RTCP Sender Report packets contain an RTP time stamp for the sampling instant of the first octet in the RTP data packet and a corresponding NTP time stamp, the RTP time stamps in the RTP data packets (measured from this first sampling instant) can be related to NTP time.

As the timing information does not vary between each RTCP packet, timing information from earlier and later RTCP Sender Report packets is valid for data samples in an RTP data stream.

Thus, although the RTCP Sender Report packet is received later in time, synchronization between the plurality of components can be established as soon as the packet is received.

In particular, the following calculation illustrates the improvement that the invention provides over the conventional method in achieving synchronization of the plurality of components. In the following, it is assumed that the new service is selected between bursts for that service (i.e. a burst for that service is not being transmitted at the time that the service switch is made).

If it is assumed that an RTCP Sender Report packet is sent every five seconds for each component in the media stream (as advised in the current standard), and the stream has a time slicing cycle of 2 seconds, the maximum time required to achieve synchronization is 7 seconds, comprising 2 seconds waiting for the correct time slice and 5 seconds for waiting for the RTCP Sender Report packet. On average, it will take 3.5 seconds to achieve synchronization, comprising 1 second waiting for the correct time slice and 2.5 seconds waiting for the RTCP packets.

However, when using the method according to the invention, the maximum time to achieve synchronization will be 6 seconds, comprising 2 seconds waiting for the correct time slice, 2 seconds waiting for the next time slice (as the current time slice does not contain an RTCP packet), 2 more seconds as the next time slice still does not contain an RTCP packet, and then 0 seconds because the RTCP packet can be read almost as soon as it is received. The average time to achieve synchronization will be 2.6 seconds, comprising 1 second waiting for the time slice, a 40% chance that the RTCP packet is in this time slice (so requiring a further wait of 0 seconds), a 40% chance that the RTCP packet is in the next time slice (so requiring a further wait of 2 seconds) and a 20% chance that the RTCP packet is in the last time slice (so requiring a further wait of 4 seconds).

In a preferred embodiment of the invention, the synchronization time can be further improved by transmitting RTCP time stamps with each burst of data samples. Thus, delays as a result of waiting for another burst are avoided.

In particular, when the RTCP packets are sent every time slice (thus every 2 seconds), the maximum time to synchronize the components using the conventional method will be 4 seconds, comprising 2 seconds waiting for the time slice and 2 seconds waiting for the RTCP packets. The average time taken to synchronize the components will be 2 seconds, comprising 1 second waiting for the time slice and 1 second waiting for the RTCP packets.

However, using the method described above with RTCP packets in every time slice results in a maximum synchronization time of 2 seconds, comprising 2 seconds waiting for the time slice. The average duration will be 1 second, comprising 1 second waiting for the time slice.

A further improvement in the time taken to synchronize the plurality of components can be obtained by storing received timing information for each service in a history table in the memory 26. As the relative values in the RTCP Sender Report packets should not change over time, the stored packets can be used when a user switches to that service.

This history table can be populated in several ways. Firstly, when the device 10 is activated, the device 10 is required to receive the time slices for all services in the broadcast. The processor 16 can search these time slices for all RTCP packets, and store these in the memory 26.

Secondly, the device 10 can carry out a periodic update to refresh the timing information for each service in the memory 26.

Thirdly, during normal service reception, the device 10 can cache the RTCP packets of the service currently being consumed. If, at some later time, the user switches back to this service, the RTCP information is already available in the memory 26. In this way, there will only be a delay in the synchronization when the device 10 is first switched to a new service.

Thus, in the absence of RTCP Sender Reports in the first time slice of a newly-selected service, cached timing information can be used to synchronize the plurality of components.

In any of these cases, in the unlikely event that the relative timings may have changed, it is fairly straightforward for the processor 16 to detect as there will be a large timing difference between the components in the media stream (for example of the order of several seconds or more), and the processor 16 can ignore any cached information that fails this test.

Further checks can be carried out on the cached information to determine if it is still valid. In particular, in addition to caching the RTCP packet in the memory 26, it is possible to cache the absolute time corresponding to the point at which the RTCP packet is received, and a presentation time stamp for a RTP packet received close to the RTCP packet. Therefore, when the presentation time stamp of an RTP packet is calculated with the cached information, the resulting presentation time stamp should be close to the absolute time difference between the time of caching plus the presentation time stamp of the moment of caching. If this is not the case, the information held in the cache is probably invalid, and the processor 16 should wait for a fresh RTCP packet.

Correction of Synchronization Between Components in an Existing Service

As described above, if the synchronization between the plurality of components in a service drifts over time, the method according to the invention allows this synchronization drift to be determined earlier than with the conventional method.

As a result of this early detection of the synchronization drift, a synchronization correction can be made over a short period of time (i.e. a number of frames) rather than at particular time instant, as in the conventional method.

In particular, the synchronization correction can be implemented by dropping video frames (if the video component is ahead in time of the other components) and/or by dropping audio samples (if the audio component is ahead in time of the other components).

After the mobile device 10 has synchronized the different media components of an RTP transmission using the first RTCP Sender Report packets sent with each of the streams, it continues to receive further RTCP information packets for each component stream. In accordance with the invention, the mobile device 10 performs a look-ahead operation on the RTCP packets in the buffer 18. In other words, the mobile device 10 extracts the timing information in the RTCP packets as soon as it is available to the device 10, rather than waiting for the packet to be streamed out of the buffer with the corresponding data samples.

As soon as such an RTCP packet has been found, the processor 16 relates the relative time stamps to absolute time, and calculates the presentation time stamps for the different media components, as usual. From this, the processor 16 determines which samples from one component should be streamed with particular samples from the other component, and compares this to the data sample pairs currently being streamed. If these sample pairs differ from what is currently being streamed, there has been drift, so the processor 16 determines how much a particular component or components need to be adjusted, and the point at which this drift should be corrected. The time at which the drift would normally be corrected is the time at which the RTCP packet is read from the buffer 18.

The processor 16 uses the determined adjustment amount and normal correction time to determine how much each (or which) component needs to be adjusted in order to synchronize the components before the RTCP packet is read out of the buffer 18.

The processor 16 can correct a synchronization drift between audio and video streams by either adding or omitting video frames (if the video is ahead or behind the audio stream respectively), or by adding or omitting audio samples (if the audio is ahead or behind the video stream respectively). Frames or samples can be added by repeating an existing frame or sample.

Preferably, the processor 16 corrects the synchronization drift by spacing the addition or omission of the frames or samples over the period of time preceding the reading of the RTCP packet from the buffer 18, so there should not be any user-perceptible artefacts in the resynchronization.

Each time that a resynchronization takes place, information relating to the resynchronization can be stored in a history table in the memory 26. The processor 16 can use the information in this table to calculate the overall average adjustment of frame or audio timings that has taken place. With this information, the processor 16 can predict a resynchronization in advance of an RTCP packet being received, and ensure that the resynchronization is implemented well before the relevant RTCP packet is read from the buffer 18. In this way, the resynchronization can be implemented over a larger time scale, which means that the transition can be made smoother still, as frame or audio sample additions or omissions can be spread further apart.

When the RTCP packets are read from the buffer 18, the timing information therein can be used to confirm that the synchronization of the components have been adjusted correctly.

Furthermore, this embodiment of the invention can be applied to non-time slicing transmissions, by introducing a special RTCP packet in the source of the transmission. This packet can contain synchronization information and a time stamp indicating when this information should be acted upon. This packet can be created and sent ahead of time by the source of the transmission, if a slight resynchronization is expected. In this way, a device can smoothly adjust the synchronization over a period of time, if this special RTCP packet is received.

Therefore, there is provided a method and device that has an improved synchronization time when a new service is selected, and that provides a smoother transition when a correction of the synchronization between the components of the media stream is implemented.

While the invention has been illustrated and described in detail in the drawings and foregoing description, such illustration and description are to be considered illustrative or exemplary and not restrictive; the invention is not limited to the disclosed embodiments.

Variations to the disclosed embodiments can be understood and effected by those skilled in the art in practicing the claimed invention, from a study of the drawings, the disclosure, and the appended claims. The invention may be implemented by means of hardware comprising several distinct elements, and/or by means of a suitably programmed processor. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope. A computer program may be stored/distributed on a suitable medium, such as an optical storage medium or a solid-state medium supplied together with or as part of other hardware, but may also be distributed in other forms, such as via the Internet or other wired or wireless telecommunication systems.

The invention claimed is:

1. A method for synchronizing a plurality of components of a broadcast media stream, each component comprising a plurality of data samples, the method comprising the acts of:
    buffering the data samples comprising relative timing and a plurality of information packets comprising relationship timing indicating a relationship between the relative timing and an absolute time, each of the information packets corresponding to one of the data samples;
    performing a look-ahead action on the buffered information packets to extract the relationship timing for each of the plurality of components;
    using the extracted relationship timing and the relative timing to synchronize the data samples of the plurality of components and to identify the data samples in the plurality of components to be streamed at the same time;
    comparing the identified data samples to a previously identified set of data samples to determine a drift between the plurality of components; and
    adding or omitting data samples from the particular component to correct for the determined drift as the data samples are streamed from the buffer.

2. The method as claimed in claim 1, wherein each information packet is associated with a respective one of the plurality of components, and the relationship timing indicates a relationship between the relative timing in their respective components and the absolute time.

3. The method as claimed in claim 1, further comprising the act of streaming the synchronized data samples in the plurality of components.

4. The method as claimed in claim 1, further comprising the acts of:
    storing the information packets in a memory; and
    using the extracted relationship timing in the information packets stored in the memory to synchronize the data samples of plurality of components until further information packets are received.

5. The method as claimed in claim 4, wherein the broadcast media stream comprises a plurality of selectable services, each including the plurality of components, the method further comprising the acts of:
    receiving information packets for components in each of the selectable services; and storing the information packets in the memory.

6. The method as claimed in claim 5, wherein the data samples comprise a first selectable service in the broadcast media stream, and wherein the stored information packets for a second selectable service are used when the second selectable service is selected, and before respective information packets for the second selectable service received.

7. The method as claimed in claim 1, wherein the data samples are received in bursts and an information packet is received with each burst.

8. The method as claimed in claim 1, wherein the drift is corrected by adding or omitting the identified data samples before the one or more data samples corresponding to the information packet used to determine the drift are streamed.

9. The method as claimed claim 1, wherein the act of adding data samples comprises the act of duplicating data samples.

10. The method as claimed in claim 1, further comprising the act of storing results of the comparing act in a memory.

11. The method as claimed in claim 10, wherein the method further comprises the acts of:
    calculating an average correction from the results stored in the memory; and
    using the calculated average correction to predict a required correction for a particular component.

12. A device for presenting a broadcast media stream to a user, the device comprising:
    a buffer for storing data samples of a plurality of components of the broadcast media stream and a plurality of information packets, each data sample comprising relative timing, and each information packet comprising relationship timing indicating a relationship between the relative timing and an absolute time, each information packet corresponding to one of the data samples; and
    a processor configured to:
        perform a look-ahead action to extract the relationship timing from the buffered information packets for each of the plurality of components;
        use the extracted relationship timing and relative timing to synchronize the data samples of the plurality of components and to indentify the data samples in the plurality of components to be streamed at the same time;
        compare the identified data samples to a previously identified set of data samples to determine a drift between the plurality of components; and
        add or omit data samples from the particular component to correct for the determined drift as the data samples are streamed from the buffer.

13. The device as claimed in claim 12, further comprising a memory for storing the extracted relationship timing.

* * * * *